US 6,406,087 B2

(12) United States Patent
Sawayanagi

(10) Patent No.: US 6,406,087 B2
(45) Date of Patent: Jun. 18, 2002

(54) BRACKET FOR ATTACHING INTERIOR EQUIPMENT

(75) Inventor: Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 4 days.

(21) Appl. No.: 09/742,381

(22) Filed: Dec. 22, 2000

(30) Foreign Application Priority Data

Dec. 24, 1999 (JP) ............................................ 11-368020

(51) Int. Cl.$^7$ .................................................. B60J 3/00
(52) U.S. Cl. ................ 296/97.9; 296/97.12; 296/97.13; 248/27.3; 174/152.6
(58) Field of Search ............................ 296/97.9, 97.12, 296/97.13; 174/153 G, 152 G; 248/27.3

(56) References Cited

U.S. PATENT DOCUMENTS

| 4,953,064 | A | * | 8/1990 | Viertel et al. ............... 296/97.9 |
| 5,031,954 | A | * | 7/1991 | Peterson et al. ........... 296/97.9 |
| 5,875,728 | A | * | 3/1999 | Ayers et al. ................. 114/264 |
| 5,973,271 | A | * | 10/1999 | Fujita ..................... 174/153 G |
| 5,975,617 | A | * | 11/1999 | Jacquemin et al. ......... 296/97.9 |
| 5,977,486 | A | * | 11/1999 | Fujita ..................... 174/153 R |
| 6,003,928 | A | * | 12/1999 | Curtindale ................. 296/97.9 |
| 6,068,323 | A | * | 5/2000 | Brown et al. ............... 296/97.9 |
| 6,250,708 | B1 | * | 6/2001 | Kurachi ..................... 296/97.9 |
| 6,287,142 | B1 | * | 9/2001 | Sawayanagi et al. ........ 439/351 |
| 6,340,193 | B1 | * | 1/2002 | Sawayanagi ................ 296/97.9 |
| 2001/0022336 | A1 | * | 9/2001 | Sawayanagi ............. 296/97.12 |
| 2002/0017800 | A1 | * | 2/2002 | Ichikawa et al. .......... 296/97.9 |

FOREIGN PATENT DOCUMENTS

| JP | 7-47839 | 2/1995 | .............. B60J/3/02 |
| JP | 63-72115 | 5/1998 | .............. B60J/3/02 |
| JP | 11-78521 | 3/1999 | .............. B60J/3/02 |
| JP | 11-507309 | 6/1999 | .............. B60J/3/00 |

OTHER PUBLICATIONS

Patent Abstract of Japan 07–047839 Feb. 12, 19995.
Patent Abstract of Japan 11–078521 Mar. 23, 1999.

* cited by examiner

Primary Examiner—Ken Patel
(74) Attorney, Agent, or Firm—Sughrue Mion, PLLC

(57) ABSTRACT

A panel fixation member of a bracket 31 for attaching a sun visor to a roof panel 33 has a pair of division walls 51a, 51b divided by slits S that divide lengthwise a surrounding wall formed substantially in a shape of a cylinder, and it is composed of a grommet screw 51 of which the diameter is expanded by insertion of a first conductive screw 43 into its inner surrounding portion in a state where it is inserted into a fitting hole 33a of the roof panel 33 thereby to be tightened in relation to the fitting hole 33a. Further, a protective wall 51c is extendedly provided for both side edges of the division wall 51a facing the slits S, which covers slit openings on a side face of the grommet screw 51 by extending in a flexible direction of the division wall 51b.

5 Claims, 6 Drawing Sheets

BRACKET FOR ATTACHING INTERIOR EQUIPMENT

BACKGROUND OF THE INVENTION

The present invention relates to improvement of a bracket used in order to attach an interior equipment of a vehicle to a vehicle body panel.

FIG. 8 shows a structure for attaching a sun visor 1 that is an interior equipment of a vehicle to a roof panel 4b that is a vehicle body panel.

The sun visor 1 comprises a sun visor body 2 provided with a vanity mirror M, a lamp for lighting the mirror, and a shaft 3 which is rotatably attached to the sun visor body 2. A bracket 5 is provided on a leading end of the shaft 3 to serve as a member for attaching the interior equipment to a roof trim 4a and roof panel 4b of the vehicle.

Further, a wire harness 7 passes through the shaft 3 of the sun visor 1. One end of the wire harness is connected to the lamp through a connector 7a, and the other end thereof is connected through a connector 9a to a wire harness 9 on the vehicle side. These wire harnesses 7, 9 have electric wires for power supply and for earth.

In order to attach this sun visor 1 onto the vehicle body side, the connector 9a of the wire harness 9 is previously pulled out from an opening 12 for harness connection of the roof trim 4a and roof panel 4b, and the connector 7a of the wire harness 7 is fitted into and connected to the connector 9a. Thereafter, the connectors 7a, 9a are pushed into a space within a roof portion 8 of the vehicle body from the opening 12. Then, the bracket 5 provided at the leading end of the shaft 3 is attached to the roof trim 4a and roof panel 4b, whereby attaching of the sun visor 1 to the roof portion 8 is completed.

When the bracket 5 of the sun visor is attached to the roof trim 4a and roof panel 4b as described above, it is generally screwed up. In order to improve assembling efficiency, as shown in FIG. 8, a panel fixation member comprising a hook 5a and grommet screw 5b is proposed.

The grommet screw 5b, as shown in FIGS. 9 and 10, is a substantially cylindrical projection that is forced into a fitting hole 4c formed in the roof panel 4b, and a pair of division walls 6a, 6b divided by slits S that divide lengthwise a surrounding wall can be elastically deformed in a radial direction.

As shown in FIG. 10, when a screw 13 is inserted into the inner surrounding face of each division walls 6a, 6b from the lower side of a through hole, the division walls 6a, 6b are elastically deformed in the diameter expanding direction (in the figure, a direction shown by an arrow), whereby the grommet screw 5b is tightened in relation to the fitting hole 4c.

Therefore, after the grommet screw 5b is firstly forced into the fitting hole 4c while the hook 5a is being caught on an inner edge of the opening 12, the screw 13 is tightened, whereby the division walls 6a, 6b open in the diameter expanding direction and are tightly fitted into the fitting hole 4c, so that the bracket 5 is firmly fixed to the roof trim 4a and roof panel 4b by the above panel fixation member.

However, since the above-described grommet screw 5b of the bracket 5 is composed of a pair of the division walls 6a, 6b divided by the slits S that divide lengthwise the substantially cylindrical surrounding wall, in case that water or the like enters into the roof portion 8, its water may flow into the grommet screw 5 through the slits S and may enter into the vehicle room along the inner wall of the grommet screw 5b.

SUMMARY OF THE INVENTION

In order to solve the above problem, an object of the invention is to provide a bracket for attaching an interior equipment that can improve the assembling efficiency into the vehicle body panel without losing waterproof property at a portion where the panel fixation member is inserted.

In order to achieve the above object, according to the present invention, there is provided a bracket module for attaching an interior equipment of a vehicle onto a vehicle body panel, comprising:

a bracket main body provided with the interior equipment;

a base member engaged with the bracket main body, and provided with a grommet having a tube-shaped body which is fitted into an opening formed in the vehicle body panel, wherein the tube-shaped body of the grommet is vertically divided by slits into a plurality of peripheral walls such that at least one of the divided peripheral walls is flexible in a radial direction thereof; and wherein a protective wall is formed on an outer face of the tube-shaped body of the grommet so as to extend in a flexed direction of the flexible divided peripheral wall while covering outside of the slits.

In this configuration, the attaching operation of the interior equipment to the vehicle body panel is performed by inserting the grommet into the opening formed in the vehicle body panel, then screwing a screw into an inner portion of the tube-shaped body to flex the divided peripheral walls outward in the radial direction, and expanding the tube-shaped body.

Further, since the slits on the side face of the tube-shaped body are covered with the protective wall and a surface area of the grommet increases, even in case that water enters into the vehicle body panel, it is possible to prevent the water from flowing into the cylindrical projection through the slits and entering into the vehicle room along the inner wall of the cylindrical projection.

Preferably, at least one of the divided peripheral walls is provided as a fixed wall having no flexibility. The protective wall is formed on an outer face of the fixed wall.

In this configuration, the tube-shaped body of the grommet which is inserted into the opening of the vehicle body panel improves its own stiffness: and the base member can be reliably attached.

Preferably, a first electric wire provided with a first terminal and connected to the interior equipment is attached onto the bracket main body, and a second electric wire provided with a second terminal and connected to a power source is attached onto a base portion of the grommet in the base member. A conductive screw is screwed into the tube-shaped body of the grommet to fix the bracket main body and the base member onto the vehicle body panel while screwing through the first and second terminals to establish an electrical conduction between the power source and the interior equipment.

In this configuration, since a connector fitting operation for terminal connection is not required, the assembling efficiency can be improved.

Preferably, the base member is provided with a provisional fixation member for provisionally fixing the base member onto the vehicle body panel before the bracket main body is engaged with the base member.

In this configuration, it is not necessary to support the base member when the bracket main body is engaged therewith, the assembling efficiency can be improved.

DETAILED DESCRIPTION OF THE PREFERRED EMBODIMENTS

A bracket for attaching an interior equipment according to one embodiment of the invention will be described below in detail with reference to the accompanying drawings.

Figure 1:
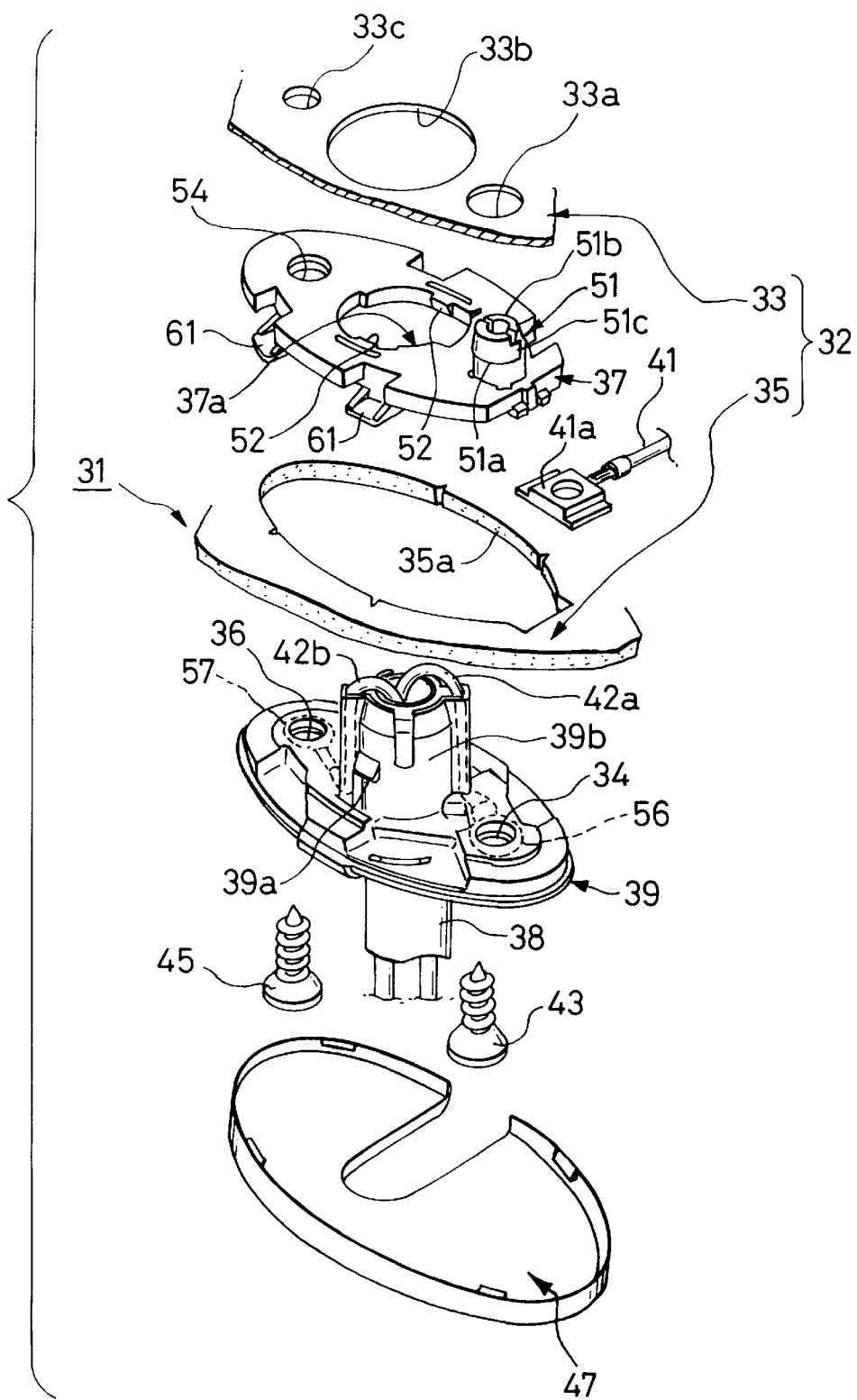
FIG. 1 is an exploded perspective view of a bracket of a sun visor according to one embodiment of the invention.

A bracket 31 is used for attaching a sun visor that is an interior equipment of a vehicle to a vehicle body panel. As shown in FIG. 1, the bracket 31 comprises a base member 37 interposed between a roof panel 33 that is the vehicle body panel and a roof trim 35 that is an interior wall member incorporated so as to cover the face of the roof panel 33; a main body 39 attached to one end of a shaft 38 attached to a sun visor body (not shown); first and second conductive screws 43, 45 for fixing these base member 37 and main body 39 to the roof panel 33; and a cover 47 for covering the face on an interior side of the main body 39.

Figure 4:
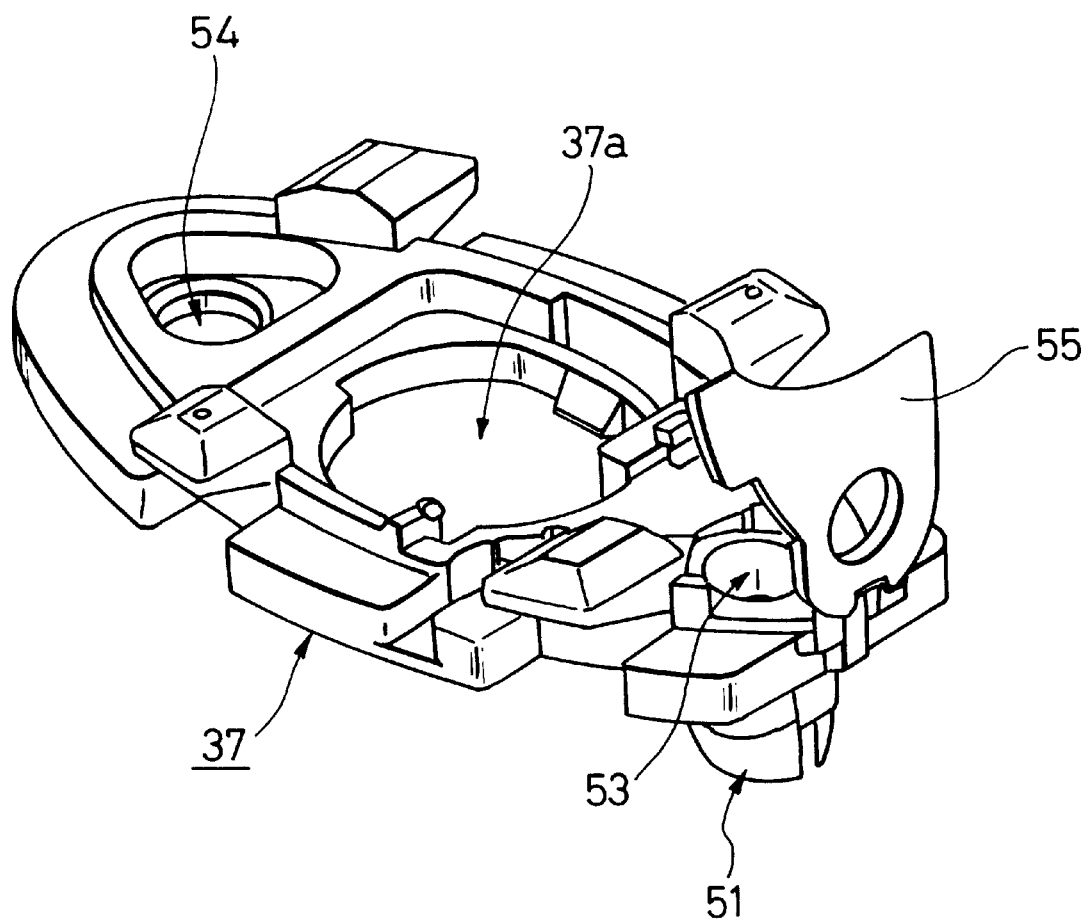
FIG. 4 is a perspective view of a rear face of a bracket body in FIG. 1.

The base member 37 made of insulating material such as synthetic resin has a grommet screw 51 serving as a panel fixation member that can be fitted into a fitting hole 33a of the roof panel 33. On the main body 39 side of this grommet screw 51, as shown in FIG. 4, a first connecting portion 53 is provided, which holds a terminal 41a of an electric wire 41 for power supply provided on the vehicle body side with a cover 55 integrally formed.

Figure 2:
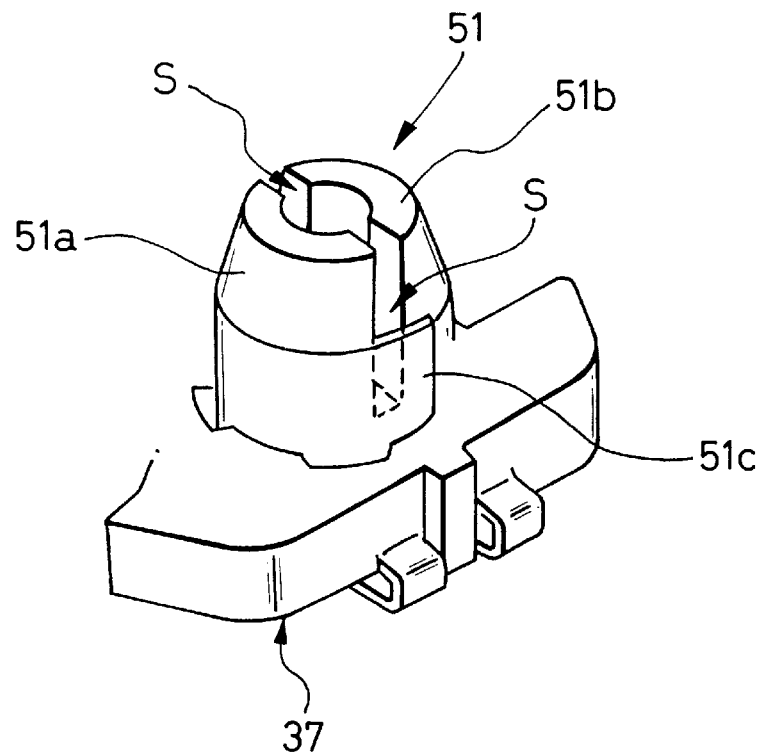
FIG. 2 is an enlarged perspective view of a grommet screw in FIG. 1.
Figure 3:
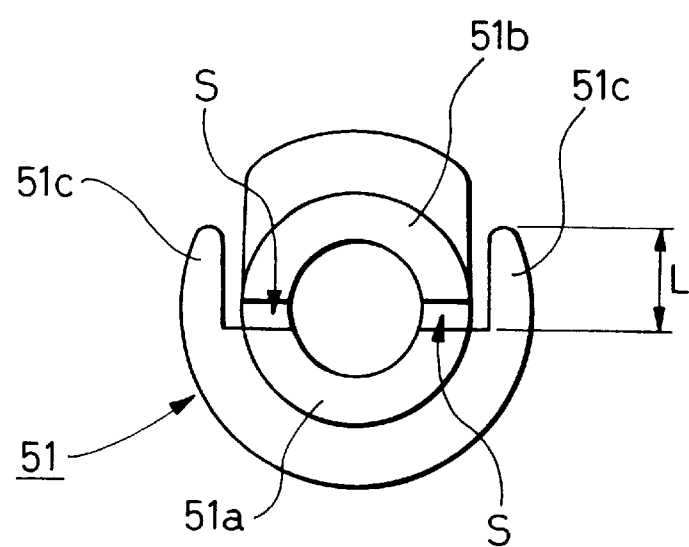
FIG. 3 is a top view of the grommet screw.

The grommet screw 51, as shown in FIGS. 2 and 3, is a substantially cylindrical projection that is forced into the fitting hole 33a formed in the roof panel 33, and has a pair of division walls 51a, 51b divided by slits S that divide lengthwise the substantially cylindrical surrounding wall. In the embodiment, the division wall 51a is a fixed wall having rigidity and the division wall 51b is a flexible wall that has flexibility and can be elastically deformed in a radial direction.

Further, on both side edges of the division wall 51a facing the slits S, protective walls 51c, 51c which cover the slit openings on the side face of the cylindrical projection by the extension in the flexible direction of the division wall 51b are extendedly provided. A length of each protective wall 51c, as shown in FIG. 3, is set to L in such a manner that the inner portion is not exposed through the slits S when the division wall 51b opens outward in the radial direction (upward in the figure) by fitting of the first screw 43 (see FIG. 6).

Further, the grommet screw 51 is used also as a screw fitting portion of the first conductive screw 43 since a through hole communicates with the first connecting portion 53. When the first conductive screw 43 is inserted into the inner portion of the grommet screw 51, the division wall 51b is elastically deformed in the diameter expanding direction, whereby the grommet screw 51 is tightened in relation to the fitting hole 33a.

Further, since the division wall 51b can be elastically deformed also in the diameter reducing direction, the base member 37 can be also provisionally fixed to the roof panel 33 by forcing the grommet screw 51 into the fitting hole 33a.

Further, in the center of the base member 37, there is formed an opening 37a into which a cylindrical portion 39b projectingly provided in the center of the main body 39 is inserted. On an inner edge of the opening 37a, there is formed a projection 52 that is detachably engaged with a projection 39a formed at the periphery of the cylindrical portion 39b to constitute a provisional fixation member between the cylindrical projection 39b and the base member 37.

Further, in the base member 37, a screw insertion hole 54 into which a second conductive screw 45 is inserted is penetratingly formed on the side opposite to the grommet screw 51 with respect to the opening 37a. The hole diameter of this screw insertion hole 54 is set larger than the diameter of the screw thread of the conductive screw 45.

Further, at the peripheral edge of the base member 37, a trim fixation member 61 is formed, which is fitted into an opening 35a of the roof trim 35 and can fix the base member 37 to the roof trim 35. The trim fixation member 61 is integrally provided with a holding piece for holding the edge of the opening 35a.

The main body 39 made of the insulating material such as the synthetic resin, as shown in FIG. 1, has a second connecting portion 34 in which a terminal 56 of a connecting connection electric wire 42a on the sun visor side is insert-molded correspondingly to the first connecting portion 53, and a third connecting portion 36 in which a terminal 57 of an earth electric wire 42b is insert-molded correspondingly to the screw insertion hole 54, with the cylindrical portion 39b formed in the center of the main body 39 between the second and third connecting portions.

In this embodiment, each of the terminal 41a, 56 and 57 is a flat terminal in which a screw insertion hole is penetratingly formed in a rectangular screw plate. In such a manner that reliable electrical connection between these first and second conductive screws 43, 45 and the terminals 41a, 56, 57 is realized by screwing the first and second conductive screws 43, 45, the inner diameter of each of the screw insertion holes is set smaller a little than the outer diameter of each of the conductive screws 43, 45. Further, the inner diameter of a screw fitting hole 33c of the roof panel 33 into which the second screw 45 is inserted is also set slight smaller than the outer diameter of the second conductive screw portion 45. The first and second conductive screws 43, 45 are tapping screws that can carve a screw thread in the mating fitted portion.

When the sun visor of the embodiment is attached to a roof 32 of the vehicle in which the face of the roof panel 33 is covered with the roof trim 35, the terminal 41a of the electric wire 41 for power supply laid along the outer face of the roof trim 35 (face on the roof panel 33 side) is firstly set to the first connecting portion 53 of the base member 37, and positioned and held by the cover 55. Thereafter, the base member 37 is attached to the opening 35a of the roof trim 35 by the trim fixation member 61.

Then, the cylindrical portion 39b of the main body 39 is inserted into the opening 37a of the base member 37, and the projection 39a provided at the periphery of the cylindrical portion 39b is fitted to the projection 52 whereby the main body 39 is provisionally engaged with the base member 37 attached to the roof trim 35.

The roof trim 35 in the embodiment can be treated as a roof module in which the sun visor is previously formed integrally through the bracket 31 (base member 37 and main body 39), so that troublesome at the custody time or at the assembling time can be reduced.

Figure 5:
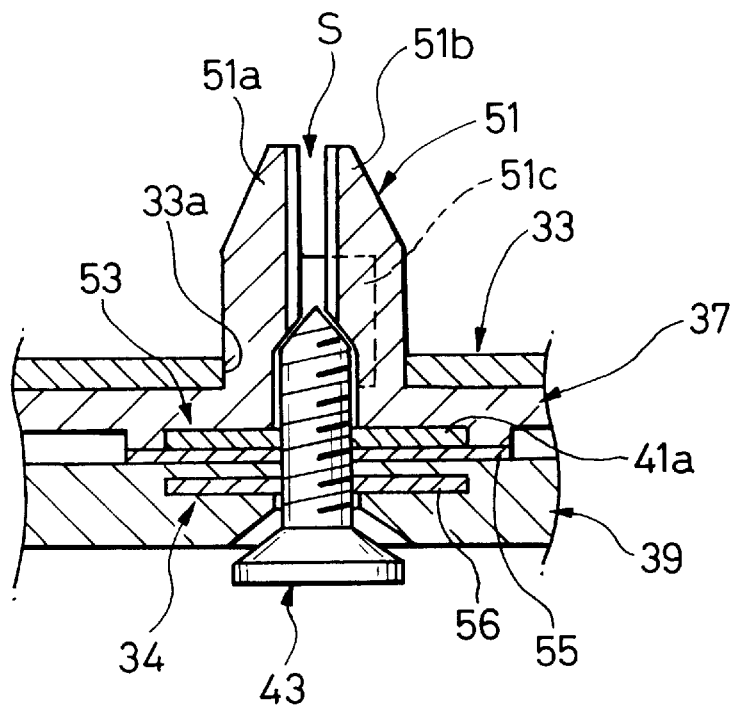
FIGS. 5 and 6 are enlarged sectional views for explaining an operation of the grommet screw.

Next, the roof trim 35 to which the sun visor is provisionally fitted through the bracket 31 is attached to the roof panel 33. At this time, the grommet screw 51 of the base member 37, as shown in FIG. 5, is forced and fitted into the fitting hole 33a of the roof panel 33 thereby to be fitted.

The roof trim 35 is provisionally fixed through the grommet screw 51 together with the bracket 31 to the roof panel 33. Therefore, when the first and second conductive screws 43, 45 are tightened to perform the complete fixing, it is not necessary to support these main body 39 and roof trim 35 by hands, so that the attachment facility can be improved.

Thereafter, the main body 39 is completely fixed to the roof panel 33 by the first and second conductive screws 43, 45.

Figure 6:
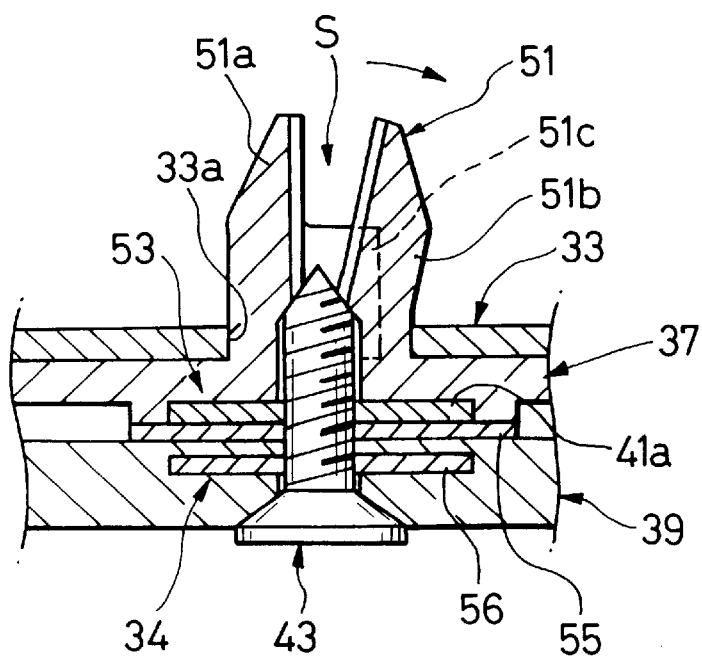

At this time, the leading end portion of the first conductive screw 43, as shown in FIG. 6, passes through the first and second connecting portions 53, 34 of the base member 37 and main body 39 and is inserted into the grommet screw 51. Then, since the division wall 51b that can be elastically deformed in the radial direction is expanded, the grommet screw 51 is tightened in relation to the fitting hole 33a of the roof panel 33.

Further, the first conductive screw 43 that has passed through the first and second connecting portions 53, 34 is applied into the screw insertion holes of the terminals 56, 41a while carving screw threads therein. Therefore, these terminals 56, 41a can be caused to conduct electrically.

Here, the grommet screw 51 that is the substantially cylindrical projection is used also as a screw fitting portion that covers the leading end portion of the first conductive screw 43 passing through the roof panel 33 when the terminal 41a of the electric wire 41 for power supply and the terminal 56 of the connection electric wire 42a are screwed.

Therefore, without short circuit of the leading end portion of the first conductive screw 43 caused by contact with the vehicle body panel 33 when the screw 43 is tightened, the screw 43 can pass through the fitting hole 33a; the terminals 56, 41a can be reliably screwed to each other; and the main body 39 and the base member 37 can be firmly fixed to the vehicle body panel 33.

Further, since the division wall 51a constituting the grommet screw 51 is the fixed wall, the grommet screw 51 inserted into the fitting hole 33a of the roof panel 33 can improve in its strength, so that the bracket 31 can be reliably attached. Needless to say, in the invention, all the division walls constituting the grommet screw may be flexible wall.

Figure 7:
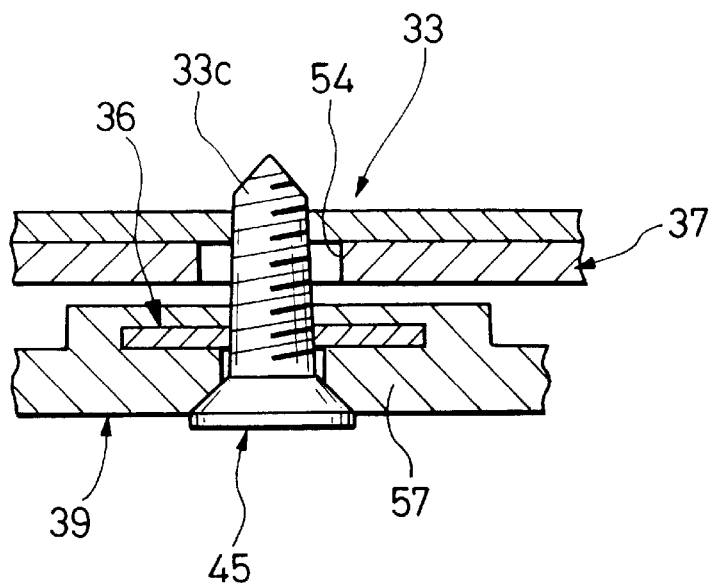
FIG. 7 is an enlarged sectional view showing an electrical connection state between a connection terminal of an earth electric wire and a vehicle body panel.
Figure 8:
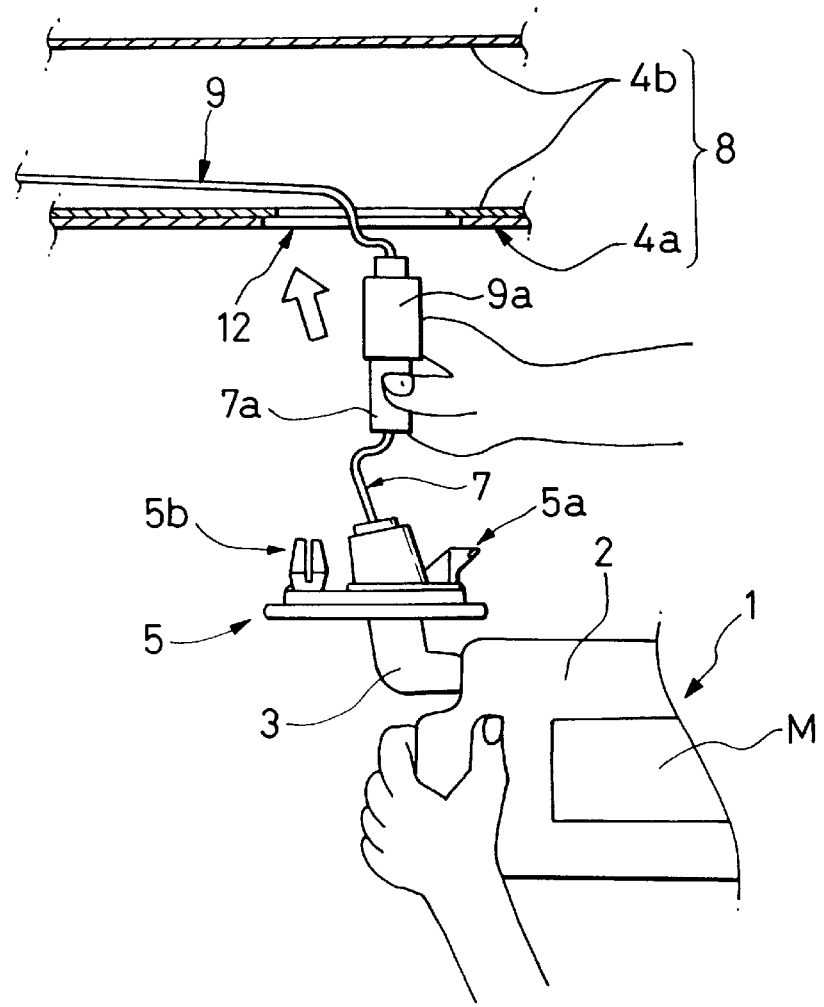
FIG. 8 is an explanatory view of attaching an interior equipment using a related bracket.
Figure 9:
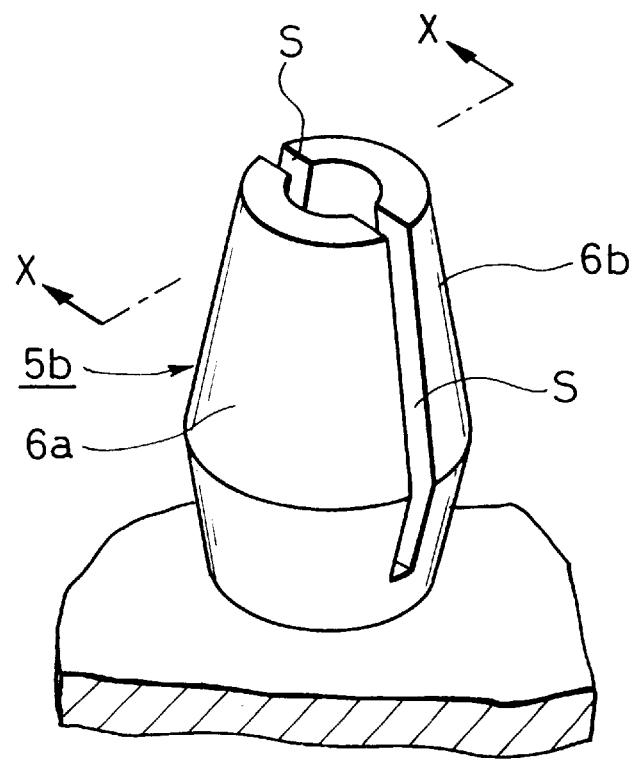
FIG. 9 is an enlarged perspective view of a grommet screw in FIG. 8.
Figure 10:
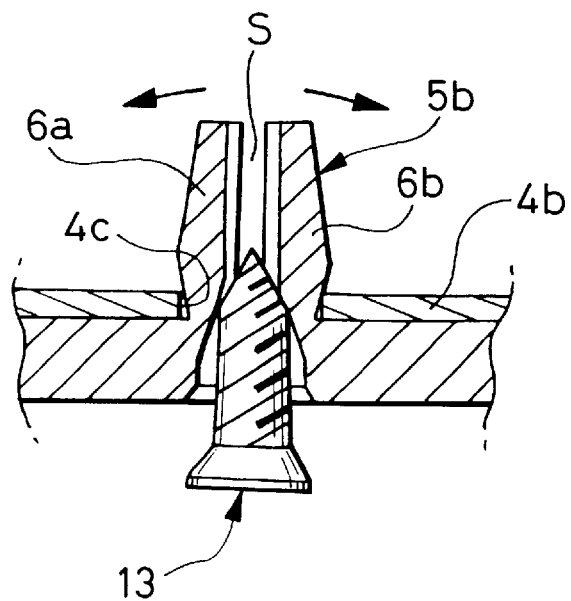
FIG. 10 is a sectional view taken along a line of X—X in FIG. 9, showing an inserted state of a screw.

On the other hand, the leading end portion of the second conductive screw 45, as shown in FIG. 7, passes through the third connecting portion 36 of the main body 39 and the screw insertion hole 54 of the base member 37 and is inserted into a screw fitting hole 33c of the roof panel 33. And, the second conductive screw 45 is applied into the terminal 57 and the screw fitting hole 33c while carving screw threads therein, so that the terminal 57 of the earth electric wire 42b and the roof panel 33 can be caused to conduct electrically by the second conductive screw 45.

Namely, the attaching of the bracket 31 to the roof panel 33 is performed by inserting the grommet screw 51 into the fitting hole 33a formed in the roof panel 33, thereafter inserting the first screw 43 into the inner surrounding portion of the grommet screw thereby to elastically deform the division wall 51b outward in the radial direction, and expanding the grommet screw 51.

According to the bracket 31 of the above-described mode, by fixing the main body 39 to the base member 37 and the roof panel 33 by the first conductive screw 43 and the second conductive screw 45, the terminal 41a of the electric wire 41 for power supply and the terminal 56 of the connection electric wire 42a can be caused to conduct electrically, and also the terminal 57 of the earth electric wire 42b and the roof panel 33 can be caused to conduct electrically.

Namely, a connector fitting operation for terminal connection between the electric wire 41 for power supply and the connection electric wire 42a or between the earth electric wire 42b and the roof panel 33 is not required, and also the provisionally fixation member constituted between the main body 39 and the base member 37 does not require the high fitting accuracy.

Further, according to the grommet screw 51 of the embodiment, as shown in FIGS. 5 and 6, since the slit on the side face of the cylindrical projection are covered with the protective walls 51c and the surface area increases, even in case that the water enters into the roof panel 33, it is possible to prevent the water from flowing into the grommet screw 51 through the slits S and from entering through the inner wall of the grommet screw 51 into the interior of the vehicle.

Further, even if the first conductive screw 43 inserted into the grommet screw 51 is applied not on the central axis of the grommet screw 51 but slantingly, since the slits 3 of the grommet screw 51 are covered with the protective walls 51c, 51c, such a disadvantage can be prevented that the leading end portion of the first conductive screw 43 protrudes outward from the slit S and comes into contact with the roof panel 33.

Therefore, there is no probability that the insulating property between the first conductive screw 43 inserted into the grommet screw 51 and the roof panel 33 is damaged.

Accordingly, without damaging the waterproof property and the insulating property in the portion where the grommet screw 51 is inserted, the assembling efficiency of the bracket 31 to the roof panel 33 can be improved.

The bracket according to the invention is not limited to the bracket 31 of the sun visor in the above embodiment. For example, it can be applied also to a bracket for attaching another interior equipment such as a room lamp unit, a rear combination lamp unit, or the like to the vehicle body panel. Further, it can also used in attaching of an interior equipment in which an auxiliary unit that does not require power supply is not included Further, in the above embodiment, the grommet screw 51 is composed of a pair of division walls 51a, 51b. However, it may be composed of, for example, walls divided into three or more.

What is claimed is:

1. A bracket module for attaching an interior equipment of a vehicle onto a vehicle body panel, comprising:
    a bracket main body provided with the interior equipment;
    a base member engaged with the bracket main body, and provided with a grommet having a tube-shaped body which is fitted into an opening formed in the vehicle body panel, wherein the tube-shaped body of the grommet is vertically divided by slits into a plurality of peripheral walls such that at least one of the divided peripheral walls is flexible in a radial direction thereof; and wherein a protective wall is formed on an outer face of the tube-shaped body of the grommet so as to extend in a flexed direction of the flexible divided peripheral wall while covering outside of the slits.

2. The bracket module as set forth in claim 1, wherein at least one of the divided peripheral walls is provided as a fixed wall having no flexibility.

3. The bracket module as set forth in claim 2, wherein the protective wall is formed on an outer face of the fixed wall.

4. The bracket module as set forth in claim 1, wherein a first electric wire provided with a first terminal and connected to the interior equipment is attached onto the bracket main body, and a second electric wire provided with a second terminal and connected to a power source is attached onto a base portion of the grommet in the base member; and wherein a conductive screw is screwed into the tube-shaped body of the grommet to fix the bracket main body and the base member onto the vehicle body panel while screwing through the first and second terminals to establish an electrical conduction between the power source and the interior equipment.

5. The bracket module as set forth in claim 1, wherein the base member is provided with a provisional fixation member for provisionally fixing the base member onto the vehicle body panel before the bracket main body is engaged with the base member.

* * * * *